United States Patent
Wantland

(10) Patent No.: US 11,974,530 B2
(45) Date of Patent: May 7, 2024

(54) HYDRATION SYSTEM FOR AN INDOOR GARDEN CENTER

(71) Applicant: Haier US Appliance Solutions, Inc., Wilmington, DE (US)

(72) Inventor: Louis A. Wantland, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 136 days.

(21) Appl. No.: 17/738,330

(22) Filed: May 6, 2022

(65) Prior Publication Data

US 2023/0354758 A1    Nov. 9, 2023

(51) Int. Cl.
| | |
|---|---|
| *A01G 31/06* | (2006.01) |
| *A01G 9/24* | (2006.01) |
| *A01G 29/00* | (2006.01) |
| *F25D 21/14* | (2006.01) |
| *A01G 31/00* | (2018.01) |

(52) U.S. Cl.
CPC ............. *A01G 31/06* (2013.01); *A01G 29/00* (2013.01); *F25D 21/14* (2013.01); *A01G 2031/006* (2013.01)

(58) Field of Classification Search
CPC .. A01G 2031/006; A01G 31/06; A01G 9/247; A01G 31/00; A01G 31/02; A01G 9/246; A01G 9/02
See application file for complete search history.

(56) References Cited

U.S. PATENT DOCUMENTS

| | | | |
|---|---|---|---|
| 9,974,250 B1* | 5/2018 | Creekmore | A01G 31/00 |
| 10,231,393 B2 | 3/2019 | Nelson | |
| 11,565,214 B1* | 1/2023 | Magee | A01G 9/249 |
| 11,800,841 B1* | 10/2023 | Wantland | A01G 27/008 |
| 2020/0352112 A1* | 11/2020 | Hunter | A01G 31/06 |
| 2020/0352360 A1* | 11/2020 | Hunter | A47F 7/0078 |
| 2021/0084828 A1* | 3/2021 | Hunter | H05B 45/20 |
| 2021/0084836 A1* | 3/2021 | Hunter | A01G 9/16 |
| 2021/0084844 A1* | 3/2021 | Hunter | A01G 9/247 |
| 2021/0176935 A1* | 6/2021 | Massey | A01G 31/06 |
| 2023/0084525 A1* | 3/2023 | Massey | A01G 31/06 |
| | | | 47/60 |

FOREIGN PATENT DOCUMENTS

| | | |
|---|---|---|
| CN | 105052597 A | 11/2015 |
| KR | 20180065733 A | 6/2018 |
| WO | WO2011135752 A1 | 11/2011 |
| WO | WO2016138075 A1 | 9/2016 |
| WO | WO2019101128 A1 | 5/2019 |
| WO | WO2021141270 A1 | 7/2021 |

* cited by examiner

*Primary Examiner* — Kristen C Hayes
(74) *Attorney, Agent, or Firm* — Dority & Manning, P.A.

(57) ABSTRACT

A gardening appliance includes a liner positioned within a cabinet and defining a grow chamber, a grow tower rotatably mounted within the liner and defining a root chamber, a sealed system including an evaporator, and a hydration system. The hydration system includes a supply conduit for providing a flow of liquid into the root chamber, a condensate collection tray positioned below the evaporator and defining a condensate collection reservoir for collecting condensate formed by the evaporator while the sealed system is operating, and a condensate return conduit fluidly coupling the condensate collection reservoir and the supply conduit for supplying the condensate into the supply conduit.

20 Claims, 9 Drawing Sheets

US 11,974,530 B2

HYDRATION SYSTEM FOR AN INDOOR GARDEN CENTER

FIELD OF THE INVENTION

The present subject matter relates generally to systems for gardening plants indoors, and more particularly, to hydration systems for use in indoor gardening appliances.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a hydration system for providing a flow of water and nutrients onto plants stored therein to facilitate plant growth. For example, typical garden centers have a nozzle that sprays liquid onto roots within a root chamber of a grow module or otherwise charges the entire root chamber with a hydrating mist. However, the water used in the hydration system is typically supplied from an onboard water storage reservoir that must be replenished frequently. In addition, indoor garden centers often generate significant condensate on the sealed system evaporator, and this condensate is typically fed to a wastewater reservoir that must be frequently emptied.

Accordingly, an improved indoor garden center would be useful. More particularly, an indoor garden center with a hydration system that improves the utilization of available water sources and reduces wastewater collection would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided. The gardening appliance includes a liner positioned within a cabinet and defining a grow chamber, a grow tower rotatably mounted within the liner, the grow tower defining a root chamber and a plurality of apertures for receiving one or more plant pods, a sealed system comprising an evaporator, a condenser, an expansion device, and a compressor, and a hydration system. The hydration system includes a supply conduit for providing a flow of liquid into the root chamber, a condensate collection tray positioned below the evaporator and defining a condensate collection reservoir for collecting condensate formed by the evaporator while the sealed system is operating, and a condensate return conduit fluidly coupling the condensate collection reservoir and the supply conduit for supplying the condensate into the supply conduit.

In another exemplary embodiment, a hydration system for a gardening appliance is provided. The gardening appliance includes a liner positioned within a cabinet and a grow tower rotatably mounted within the liner, the grow tower defining a root chamber and a plurality of apertures for receiving one or more plant pods, and an evaporator. The hydration system includes a supply conduit for providing a flow of liquid into the root chamber, a condensate collection tray positioned below the evaporator and defining a condensate collection reservoir for collecting condensate formed by the evaporator, and a condensate return conduit fluidly coupling the condensate collection reservoir and the supply conduit for supplying the condensate into the supply conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
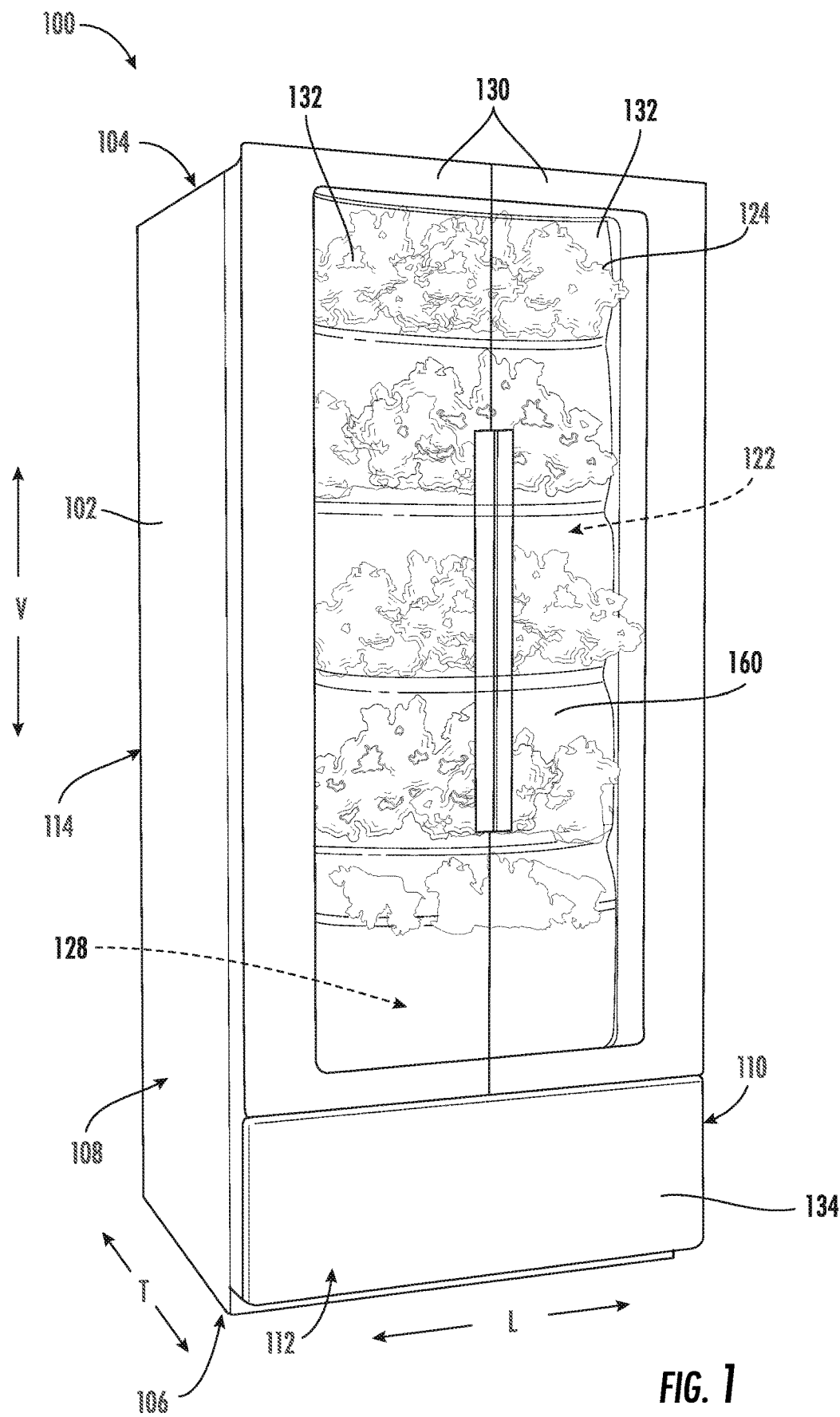
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
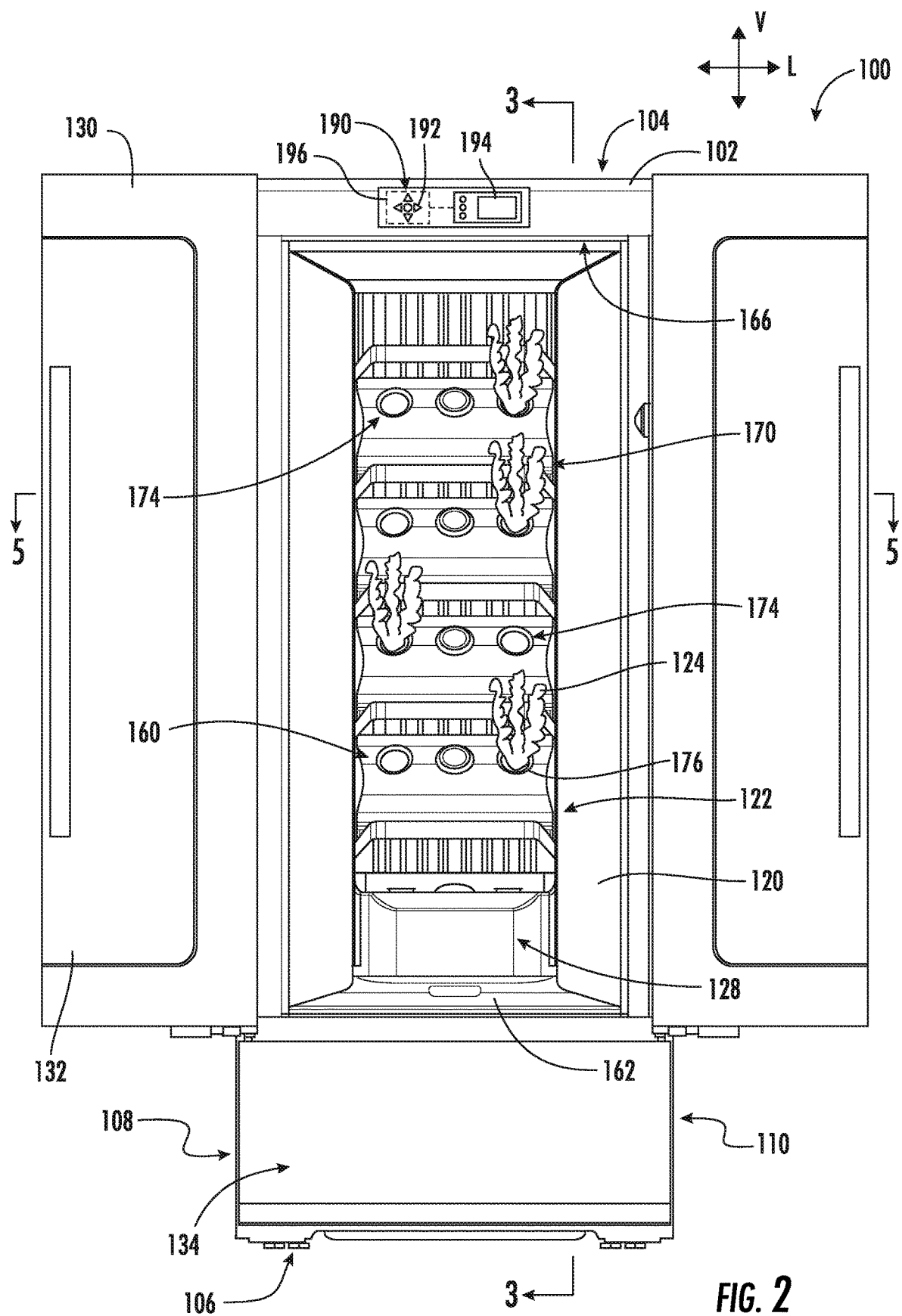
FIG. 2 depicts a front view of the exemplary gardening appliance of FIG. 1 with the doors open according to an exemplary embodiment of the present subject matter.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
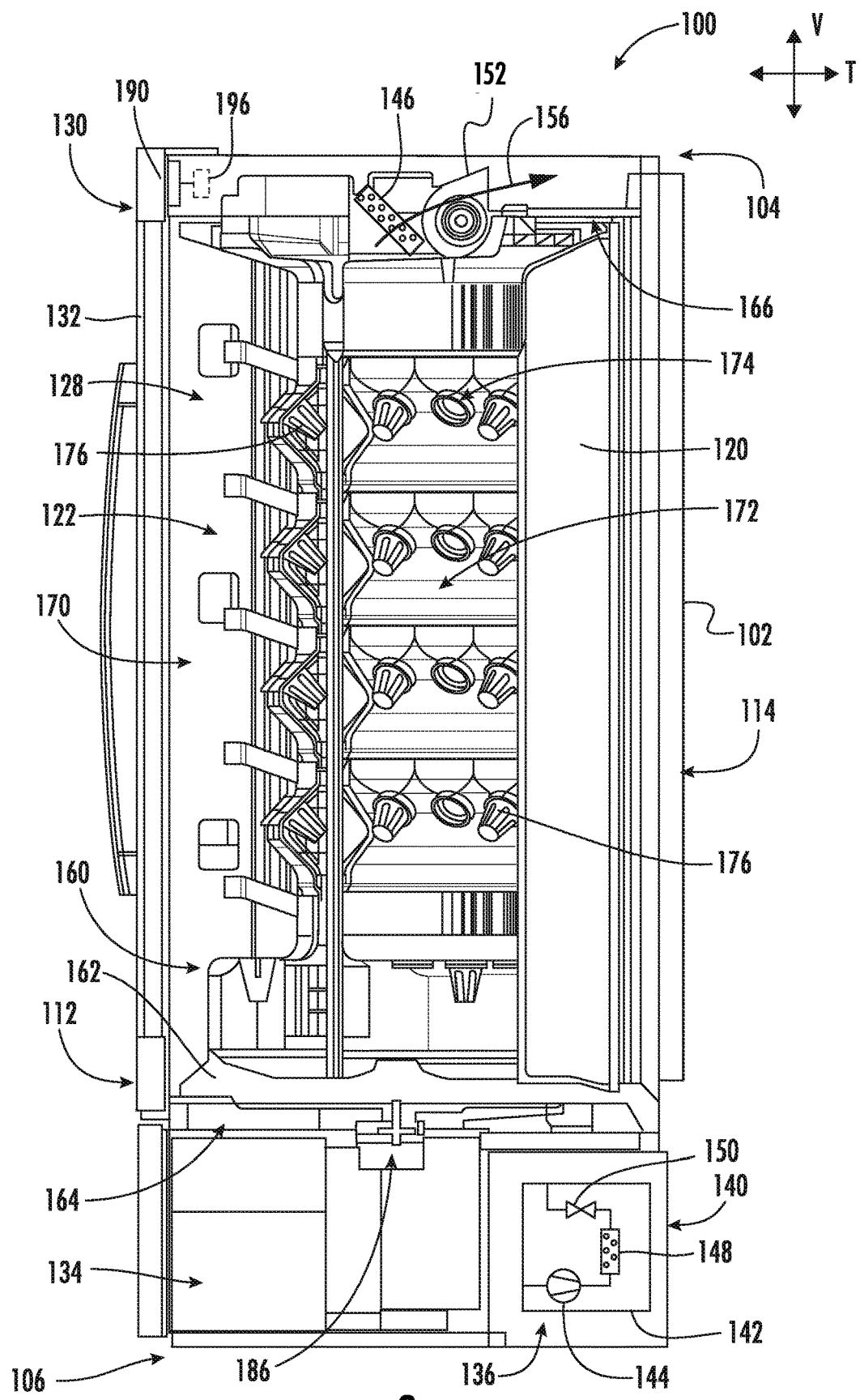
FIG. 3 is a cross sectional view of the exemplary gardening appliance of FIG. 1, taken along Line 3-3 from FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170. In addition, according to the illustrated embodiment, root chamber 172 may be operably coupled with sealed system 142 for facilitating suitable climate control within the root chamber 172, e.g., to achieve desirable growing conditions.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
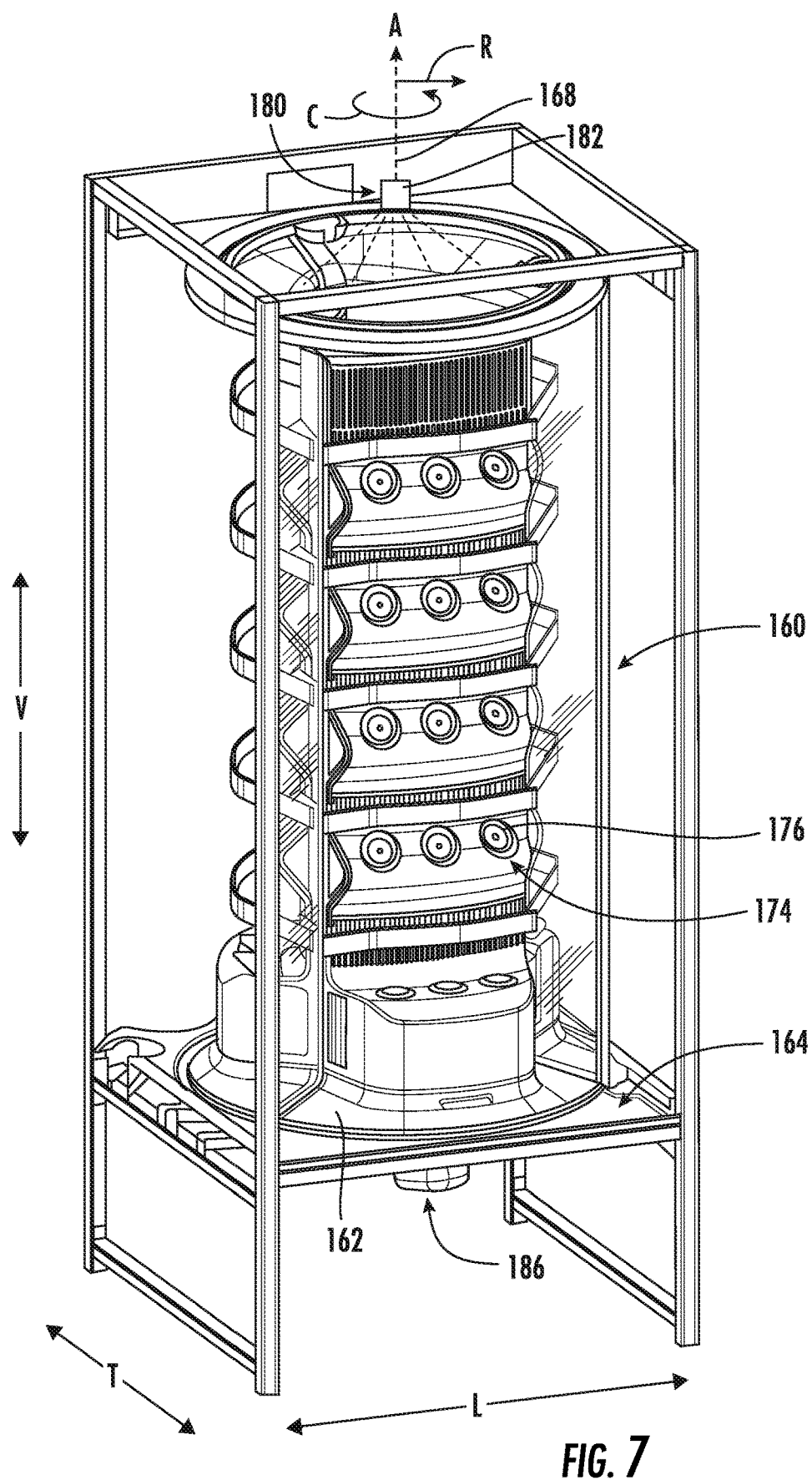
FIG. 7 provides a perspective view of a grow tower of the exemplary gardening appliance of FIG. 1 according to an exemplary embodiment of the present subject matter.

As best shown in FIG. 7, environmental control system 140 may further include a hydration system 180 which is generally configured for providing water and/or nutrients to plants 124 to support their growth. Specifically, according to the illustrated embodiment, hydration system 180 may be fluidly coupled to a water supply and or nutrient distribution assembly to selectively provide desirable quantities and concentrations of hydration, nutrients, and/or other fluids onto plants 124 to facilitate improved plant growth. For example, hydration system 180 includes misting device 182 (e.g., such as a fine mist spray nozzle or nozzles) that is fluidly coupled to a water supply (not shown). For example, the water supply may be a reservoir containing water (e.g., distilled water) or may be a direct connection municipal water supply. According to exemplary embodiments, hydration system 180 may include one or more pumps (not shown) for providing a flow of liquid nutrients to misting device 182. In this regard, for example, water or nutrients that are not absorbed by roots of plants 124 may fall under the force of gravity into sump 164 and these pumps may be fluidly coupled to sump 164 to recirculate the water through misting device 182.

According to the illustrated embodiment, misting device 182 is positioned at a top of root chamber 172 and may be configured for charging root chamber 172 with mist for hydrating the roots of plants 124. Alternatively, misting devices 182 may be positioned at a bottom of root chamber 172 (e.g., within sump 164) for spraying a mist or water into root chamber 172. Because various plants 124 may require different amounts of water for desired growth, hydration system 180 may alternatively include a plurality of misting devices 182, e.g., all coupled to the water supply and/or nutrient supplies. This plurality of misting devices 182 may be spaced apart at along the vertical direction V within root chamber 172. In this manner, these misting devices 182 may provide different concentrations of hydration and/or nutrients to different regions within root chamber 172.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
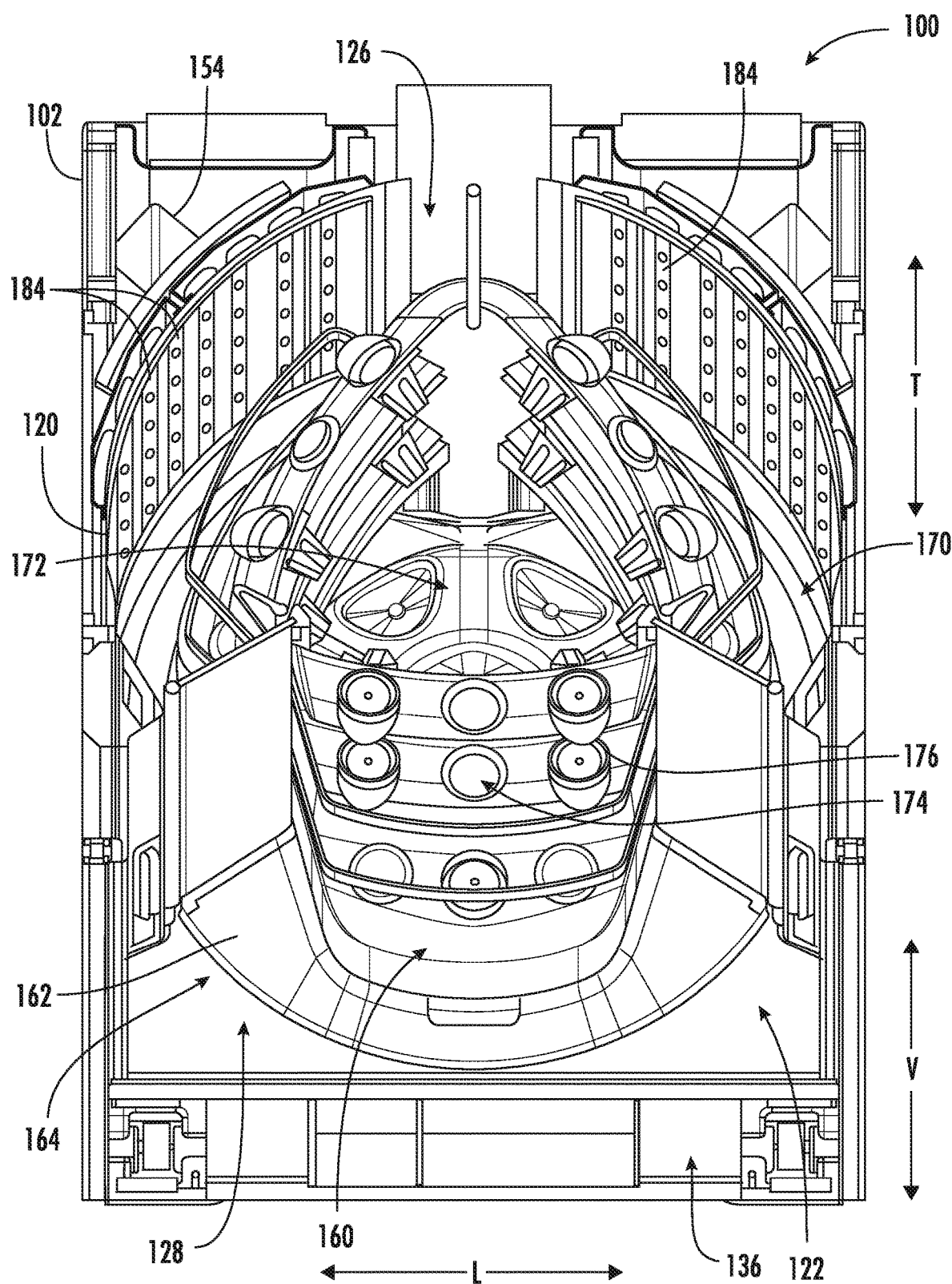
FIG. 5 is a perspective cross-sectional view of the exemplary gardening appliance of FIG. 1, taken along Line 5-5 from FIG. 2.
Figure 6:
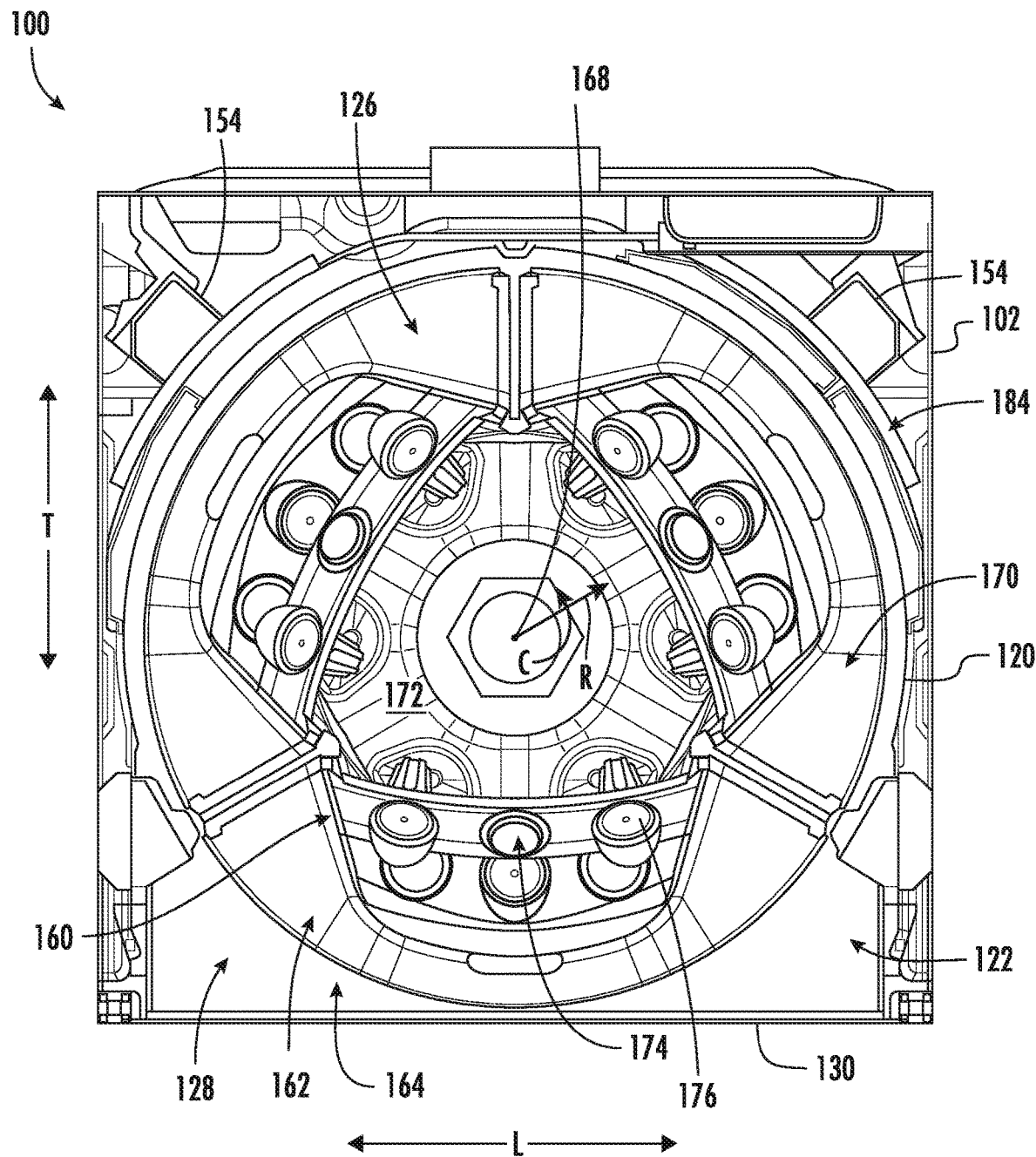
FIG. 6 is a top cross-sectional view of the exemplary gardening appliance of FIG. 1, taken along Line 5-5 from FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flipflops, AND/OR gates, and the like) to perform control functionality instead of relying upon software.

Controller 196 may include, or be associated with, one or more memory elements or non-transitory computer-readable storage mediums, such as RANI, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
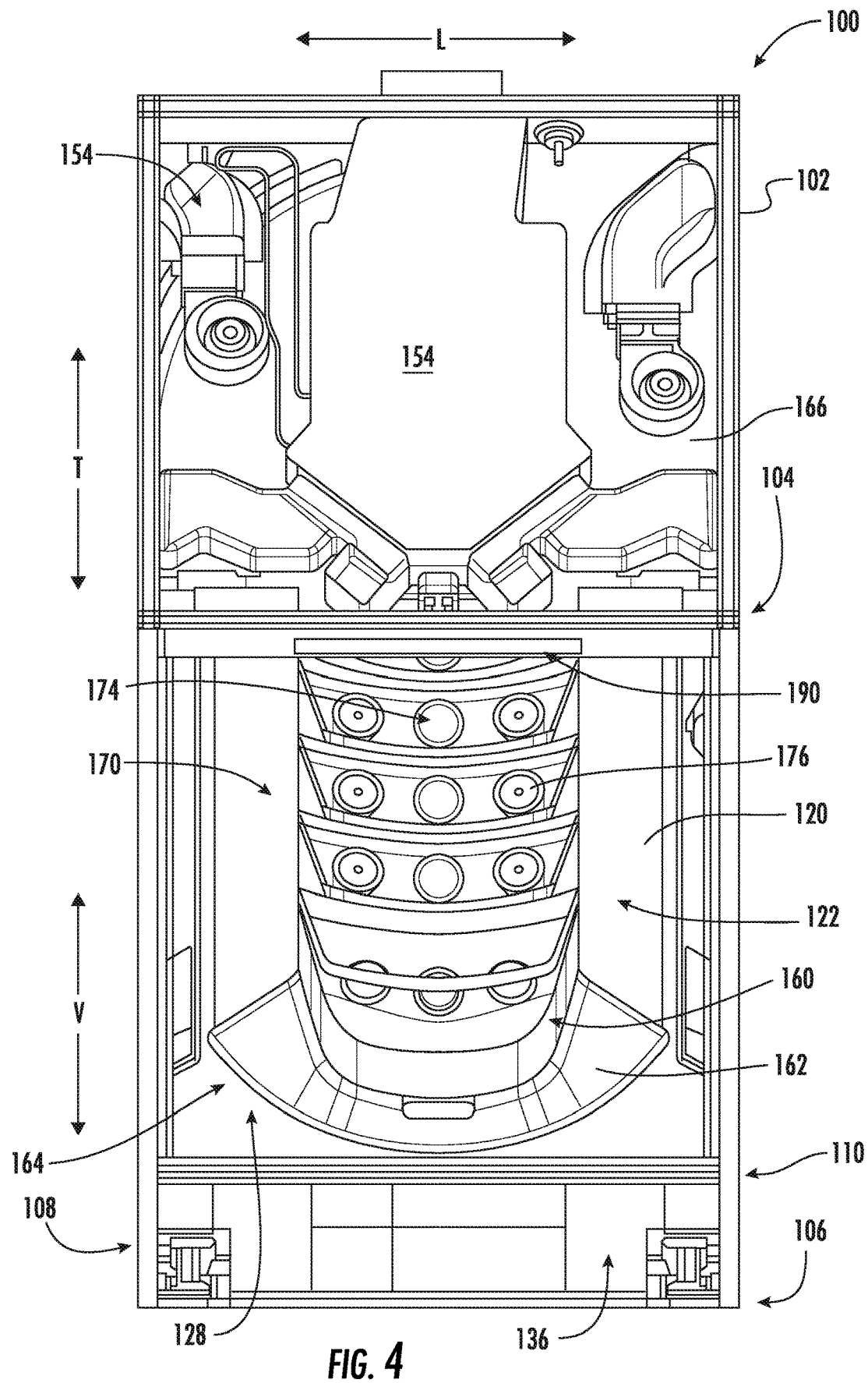
FIG. 4 is a top perspective view of the exemplary gardening appliance of FIG. 1, with a top panel and doors removed according to an exemplary embodiment of the present subject matter.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 180 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Figure 8:
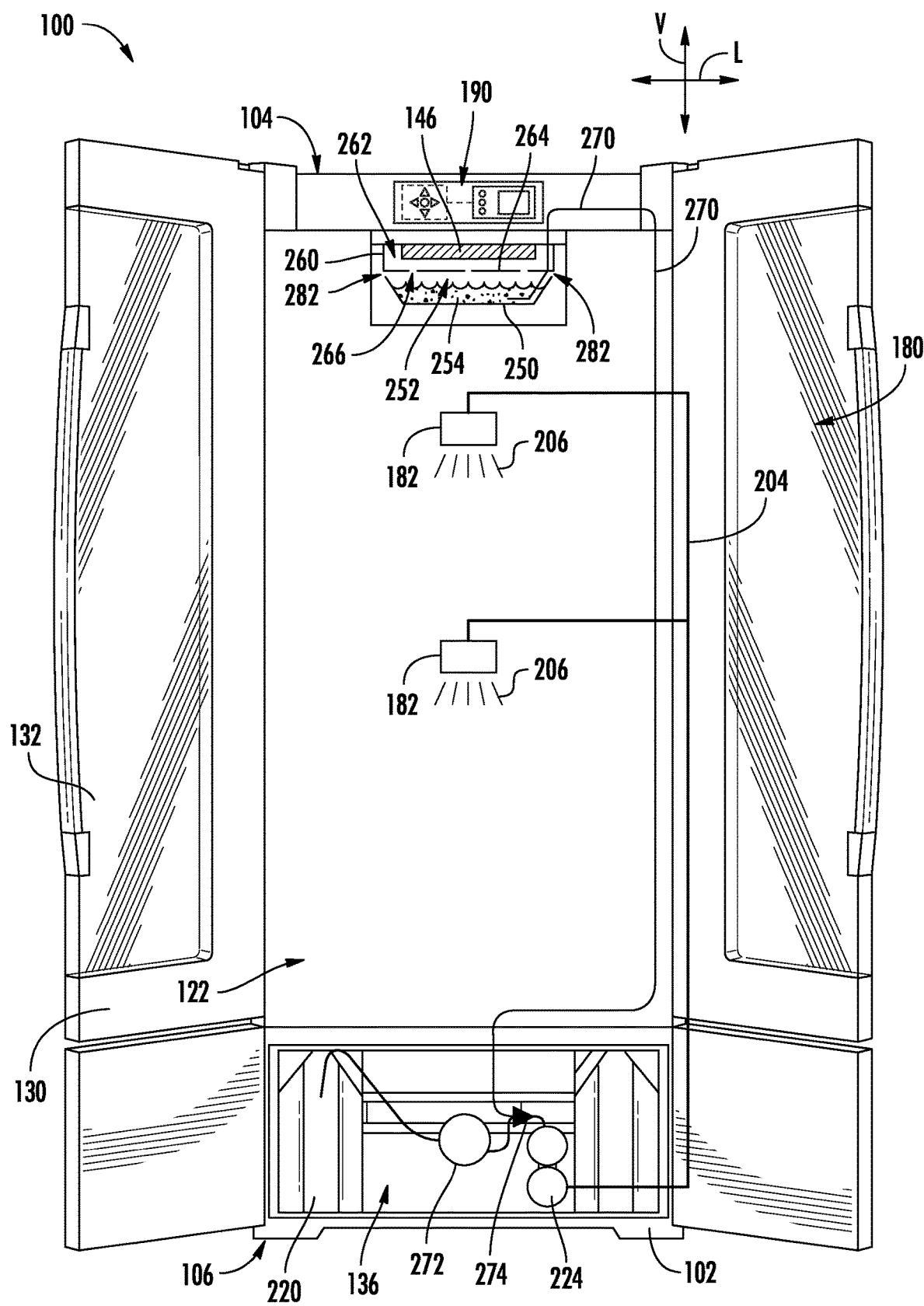
FIG. 8 provides a front schematic view of the exemplary gardening appliance of FIG. 1 and a hydration system according to an exemplary embodiment of the present subject matter.
Figure 9:
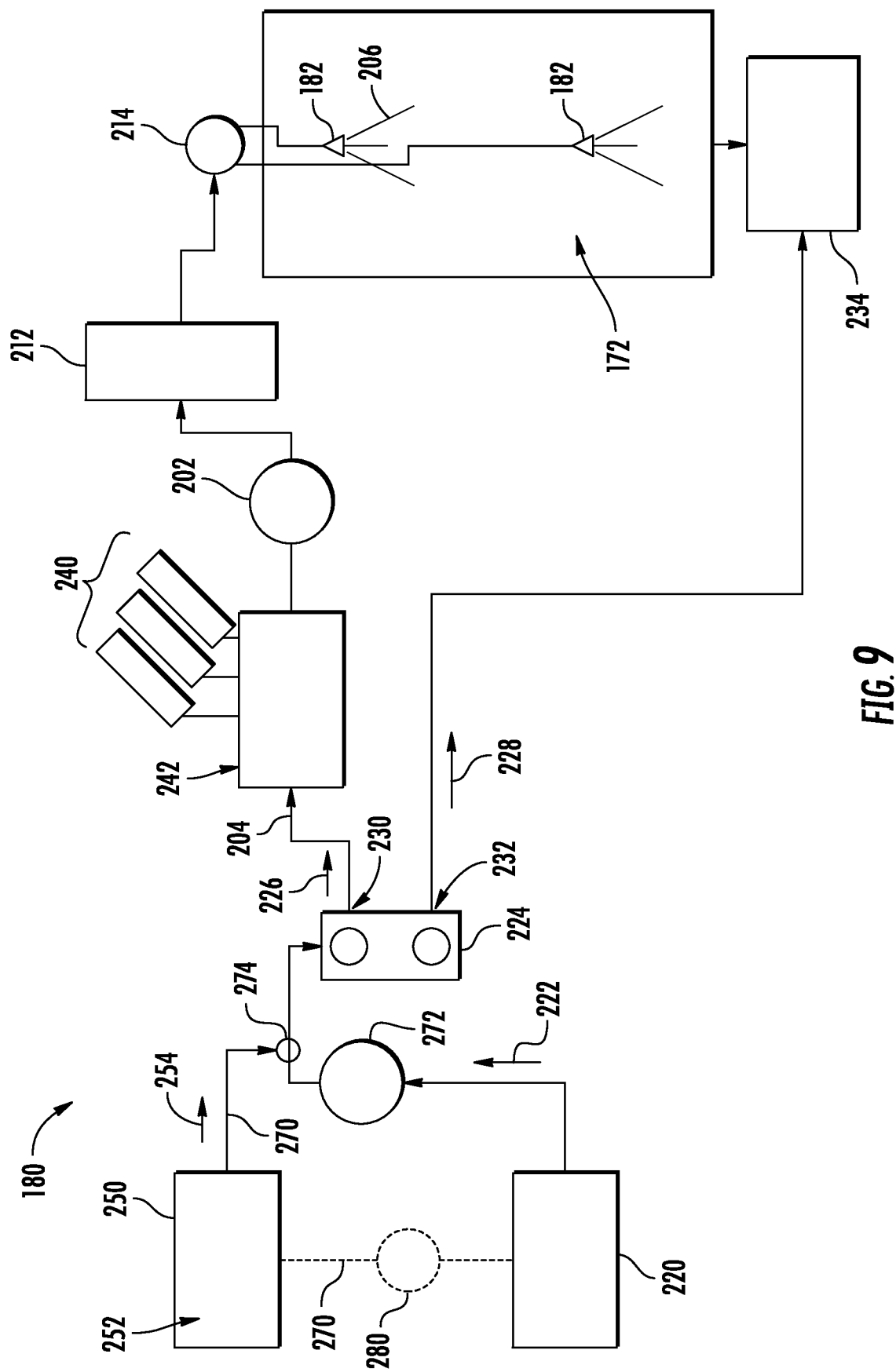
FIG. 9 provides a schematic system view of the exemplary hydration system of FIG. 8 according to an exemplary embodiment of the present subject matter.

Referring now generally to FIGS. 8 and 9, hydration system 180 will be described in more detail according to exemplary embodiments of the present subject matter. In this regard, FIG. 8 provides a front view of gardening appliance 100 with grow tower 160 removed for clarity and FIG. 9 provides a schematic system view of hydration system 180 according to example embodiments. Although an exemplary hydration system 180 will be described herein as being used with the exemplary gardening appliance 100, it should be appreciated that variations to hydration system 180 may be made and hydration system may be used in different gardening appliances while remaining within the scope of the present subject matter.

According to exemplary embodiments, hydration system 180 may include any suitable number and configuration of pumps, devices, or mechanisms for selectively urging the nutrient mixture or the flow of liquid onto plants 124. For example, according to the illustrated embodiment, hydration system 180 includes a discharge pump 202 that is fluidly coupled to a supply conduit 204 (see, e.g., FIG. 9) for selectively pressurizing and urging a flow of water and/or other nutrients (e.g., referred to herein as a flow of liquid 206) through supply conduit 204.

In addition, as explained above, hydration system 180 includes one or more discharge nozzles or misting nozzles 182 that are in fluid communication with supply conduit 204. Thus, discharge pump 202 may be configured for selectively operating to provide the flow of liquid 206 through misting nozzles 182 into root chamber 172 and/or climate-controlled chamber 122 to hydrate plants 124. Although one exemplary configuration of discharge nozzles 182 is described herein, it should be appreciated that discharge nozzles 182 may include any other suitable number, type, configuration, and position of devices for supplying water, hydration, or other nutrients to plants 124 (e.g., such as a two-nozzle configuration illustrated in FIG. 9).

In addition, hydration system 180 includes an accumulator 212 that is generally configured for receiving and storing pressurized water or liquid. In this regard, the term "accumulator" may generally be used to refer to any suitable device for receiving, storing, and distributing pressurized liquid. For example, accumulator 212 may be a sealed container containing an air bladder that is compressed as pressurized water is supplied into accumulator 212. The air within the air bladder may be compressed to maintain the pressure of the water within accumulator 212 and may expand to discharge water when the supply conduit 204 is no longer pressurized. In this manner, accumulator 212 may operate to absorb hydraulic disturbances and maintain a substantially constant pressure and flow rate for the flow of liquid 206. It should be appreciated that other means for maintaining the hydraulic pressure within accumulator 212 may be used while remaining within the scope of the present subject matter.

According to exemplary embodiments, hydration system 180 may further include one or more valves positioned throughout hydration system 180 for regulating the flow of liquid or other fluid flows therein. For example, as illustrated in FIG. 9, hydration system 180 includes a discharge valve 214 that is operably coupled to supply conduit 204 or directly to discharge nozzle 182 for selectively regulating the flow of liquid. For example, according to the illustrated embodiment, discharge valve 214 is a three-way valve that is capable of directing the flow of liquid to an upper discharge nozzle 182, a lower discharge nozzle 182, or both. Although a single, three-way discharge valve 214 is illustrated as regulating the flow of liquid to all discharge nozzles 182, it should be appreciated that hydration system 180 may include a plurality of independently adjustable discharge valves that can provide the flow of liquid to specific plants according to specific hydration schedules.

According to exemplary embodiments, supply conduit 204 may be fluidly coupled to any suitable number and type of fluid supplies to provide the desired amount of liquid or liquid having the desired nutrients and characteristics into supply conduit 204. In this regard, it may frequently be desirable to provide fresh water through discharge nozzles 182. For example, fresh water may be desired in order to reduce the buildup of mildew, mold, bacteria, or to otherwise regulate nutrient levels within the flow of liquid. Specifically, according to an exemplary embodiment, hydration system 180 includes a water supply 220 that contains fresh water (e.g., indicated generally by schematic lines 222 in FIG. 9), such as pure tap water, distilled water, or water from any other external fluid supply source. For example, water supply 220 may be a municipal water supply that provides a flow of pressurized water. According to still other embodiments, water supply 220 may include any other suitable sources of water, such as a water storage tank that may be filled by a user and that is contained within cabinet 102. It should be appreciated that water supply 220 may include any suitable pumps, flow regulating valves, or other flow regulating devices needed to regulate the flow of freshwater 222.

According to exemplary embodiments, a filtration system 224 is integrated into hydration system 180 of gardening appliance 100 that includes one or more filters that are generally configured for receiving and filtering fresh water 222 to generate treated water (e.g., indicated generally by schematic lines 226 in FIG. 9) and wastewater (e.g., indicated generally by schematic lines 228 in FIG. 9). Specifically, according to the exemplary embodiments, filtration system 224 includes a reverse osmosis filter. As used herein, the term "reverse osmosis filter" is generally intended refer to any suitable number, type, and configuration of filters that implement a reverse osmosis process to remove contaminants from fresh water 222. For example, according to an exemplary embodiment, the reverse osmosis filter may utilize membrane or hollow fiber separation technologies, although any other suitable reverse osmosis technology may be used according to alternative embodiments.

In this regard, reverse osmosis is generally the process of filtering water using a semipermeable membrane that allows fresh water to permeate from a contaminated side of the membrane, through the semipermeable membrane, and into a filtered side of the semipermeable membrane. Contaminants, e.g., dissolved solids, in fresh water 222 are not permitted to pass through the semipermeable membrane create a liquid with concentrated contaminants, referred to herein as wastewater 228. Further details regarding the reverse osmosis process are omitted here for brevity but should be understood by one of ordinary skill in the art.

According to the exemplary embodiments, filtration system 224 may further include one or more prefilters that filter fresh water 222 before passing it into the reverse osmosis filter. For example, the prefilters may include an activated carbon filter (not shown) that reduces multiple organic compounds (VOCs), chlorine, and any other contaminants that may result in a bad taste or odor in treated water 226. It should be appreciated that any suitable number, type, and configuration of filters maybe used according to exemplary embodiments.

As illustrated, filtration system 224 generally defines a treated water outlet 230 through which treated water 226 may be discharged and a wastewater outlet 232 through which wastewater 228 may be discharged. In addition, filtration system 224 may include a treated water conduit that is fluidly coupled to treated water outlet 230 for receiving the flow of treated water 226. Similarly, a wastewater conduit may provide fluid communication between wastewater outlet 232 and an external drain or a wastewater reservoir 234. As used herein, the terms "external drain," "wastewater reservoir," and the like are generally intended to refer to any drainage system, receptacle, or reservoir that is generally intended to receive wastewater 228 from a filtration system 224, water collected within sump 164, or any other discharged or unwanted water from hydration system 180.

For example, according to an exemplary embodiment, wastewater reservoir 234 may be plumbed directly to a municipal sewage drain or wastewater treatment center. According to still other embodiments, wastewater reservoir 234 may be a removable wastewater reservoir that is stored within cabinet 102 gardening appliance 100. In this regard, filtration system 224 may be designed for producing significantly less wastewater 228 than conventional filtration systems, thereby making onboard wastewater storage a practical solution. As a result, gardening appliance 100 may not need to be fluidly coupled to a permanent wastewater plumbing system or drain. Instead, the wastewater storage reservoir may be periodically emptied by a user of gardening appliance 100, e.g., by removing the wastewater storage reservoir and dumping the wastewater 228 into a sink or another drain.

According to exemplary embodiments, hydration system 180 may further include a nutrient dosing system 240 that is generally configured for facilitating the distribution of nutrient-rich liquid throughout gardening appliance 100 for improved plant growth. In this regard, for example, nutrient dosing system 240 may include a nutrient supply and a mixing system that provides a flow of nutrients in the desired concentrations. Nutrient dosing system 240 may include replaceable or refillable nutrient cartridges that are filled with nutrients in concentrated form or may receive a nutrient supply from any other suitable location. As used herein, the term "nutrients" and the like are intended generally to refer to any substances which facilitate improved growth of plants 124. For example, according to exemplary embodiments, nutrients may include calcium, magnesium, potassium, sulfur, copper, zinc, boron, molybdenum, iron, cobalt, manganese, phosphorous, and chlorine. Nutrients may also be used to refer to chemicals or substances that can be used to adjust a pH of the nutrient mixture, a level of total dissolved solids (TD S), etc. According to alternative embodiments, any other suitable mixture or combination of compositions for encouraging root growth and plant growth may be used while remaining within the scope of the present subject matter.

Nutrient dosing system 240 may further include features for discharging selected flow rates or volumes of nutrients, such as pumps or discharge mechanisms. According to exemplary embodiments, nutrient dosing system 240 may include a plurality of nutrient dosing pumps, such as solenoid-actuated plunger valves, a dedicated pump (e.g., such as a peristaltic pump), or a flow regulating valve that may selectively dispense any desired nutrients, at desired rates, and at desired times. Thus, nutrient dosing system 240 provides any suitable number, type, and combinations of nutrients at any suitable flow rates and volumes for mixing within hydration system 180.

For example, according to exemplary embodiments, nutrient dosing system 240 may include a plurality of flow regulating valves, discharge mechanisms, pumps, and supply nozzles that are all in operative communication with controller 196 of gardening appliance 100. As such, controller 196 may make informed decisions regarding the desired flow of diluted nutrient mixture based on the type, quality, and position of plants 124 within grow tower 160. For example, controller 196 may regulate the type of nutrients supplied, the nutrient concentrations, which nozzles receive the flow of diluted nutrients, etc. In addition, nutrient dosing system 240 may make other adjustments that facilitate improved plant growth and ecosystem health within gardening appliance 100.

According to the illustrated embodiment, hydration system 180 may further include a mixing tank 242 that is generally configured for receiving treated water 226 from filtration system 224 along with nutrients from nutrient dosing system 240. Mixing tank 242 may include any suitable agitators, stirrers, or other devices for creating a flow of nutrient rich mixture, referred to herein as flow of liquid 204. In general, mixing tank 242 includes an internal mixing reservoir that receives water and nutrients to create the flow of liquid 206. As explained briefly above, controller 196 of gardening appliance 100 may independently regulate nutrient dosing system 240 to provide the desired amount and concentration of nutrients into mixing tanks 242 and the resulting flow of liquid 206 may be selectively discharge through the one or more discharge valves 182.

As explained briefly above, evaporator 146 of sealed system 142 generates condensate during operation. This condensate is typically directed into an external drain or wastewater reservoir, e.g., such as the wastewater reservoir 234. However, storage of this condensate requires a larger wastewater reservoir 234 and/or requires that the reservoir be emptied more often. In addition, the condensate is not typically used in a productive manner. For example, collected condensate may be used to hydrate plants 124, thereby reducing the water supply burden on water supply 220 and requiring less frequent filling of any water supply tanks. Accordingly, aspects of the present subject matter are directed to systems and methods for utilizing collected condensate for improved water usage efficiency, wastewater storage efficiency, and performance of gardening appliance 100.

Specifically, referring still generally to FIGS. 8 and 9, hydration system 180 may further include a condensate collection tray 250 that is positioned below evaporator 146 and which defines a condensate collection reservoir 252 for collecting condensate (e.g., identified herein generally by reference numeral 254) that is formed by the evaporator 146 while sealed system 142 is operating. In general, condensate collection tray 250 may be formed from any suitable material and may be positioned in any suitable manner for collecting condensate 254 under the force of gravity. However, it should be appreciated that variations and modifications may be made to condensate collection tray 250 while remaining within the scope of the present subject matter.

For example, according to the illustrated embodiment, gardening appliance 100 may include an evaporator housing 260 that generally defines an evaporator plenum 262 within which evaporator 146 is received. In general, a bottom wall 264 of evaporator housing 260 is positioned immediately below evaporator 146 along the vertical direction V and is positioned between condensate collection reservoir 252 and evaporator plenum 262. According to exemplary embodiments, bottom wall 264 may include a sloped surface for facilitating the collection of condensate 254 that drips off evaporator 146 during operation. In addition, the bottom wall 264 may define one or more apertures 266 that permit condensate 254 to flow from evaporator plenum 262 through bottom wall 264 and into condensate collection reservoir 252.

Notably, according to the illustrated embodiment, evaporator plenum 262 is positioned directly above condensate collection reservoir 252 along the vertical direction V. In addition, condensate collection reservoir 252 is positioned directly above root chamber 172 along the vertical direction V. In this manner, by positioning evaporator 146 at the top of gardening appliance 100, convective cooling of climate-controlled chamber 122 may be achieved. In addition, condensate 254 generated by evaporator 146 may be collected and repurposed relying at least in part on gravity.

Notably, in order to reuse collected condensate 254, hydration system 180 may include features for feeding the collected condensate 254 back into supply conduit 204. In this regard, according to the illustrated embodiment, hydration system 180 may further include a condensate return conduit 270 that extends between and fluidly couples condensate collection reservoir 252 with supply conduit 204 for supplying the flow of condensate 254 into supply conduit 204. In general, condensate return conduit 270 may be fluidly coupled at any location along the supply conduit 204 for supplementing fresh water 222 that is supplied into hydration system 180. Although exemplary configurations are described below, it should be appreciated that variations and modifications may be made while remaining within the scope of the present subject matter.

According to the illustrated embodiment, condensate return conduit 270 may extend from the connection point on supply conduit 204 located proximate a bottom of gardening appliance all the way up to condensate collection reservoir 252. More specifically, condensate return conduit 270 may extend above condensate collection tray 250 and may be turned or curved downward along the vertical direction into position such that an inlet of condensate return conduit 270 is positioned proximate a bottom of condensate collection reservoir 252. In this manner, condensate return conduit may form an inverted J-trap that prevents condensate from dripping through condensate return conduit 270 unless a negative pressure is generated, e.g., by a supply pump or venturi (described below).

According to the illustrated embodiment, hydration system 180 includes a fresh water supply pump 272 that is positioned on supply conduit 204 between water supply 220 and filtration system 224. Fresh water supply pump 272 may generally be any suitable fluid pump for directing the flow of fresh water 222 through filtration system 224 and the rest of supply conduit 204. According to the illustrated embodiment, condensate return conduit 270 may be fluidly coupled to supply conduit 204 immediately downstream of fresh water supply pump 272 (e.g., between fresh water supply pump 272 and filtration system 224).

In addition, according to the illustrated embodiment, condensate return conduit 270 may be fluidly coupled to supply conduit 204 using a venturi 274. In this manner, when fresh water supply pump 272 urges a flow of fresh water 222 through supply conduit 204, the pressure of the flow through venturi 274 may draw in condensate 254 through condensate return conduit 270 from condensate collection reservoir 252, thereby supplementing the flow of freshwater 222 with condensate 254. According to alternative embodiments, condensate return conduit 270 may be coupled using venturi 274 at any other suitable location along supply conduit 204.

Notably, according to alternative embodiments, instead of using venturi 274 to connect condensate return conduit 270 to supply conduit 204, any other suitable fluid coupling mechanism may be used. For example, as shown in dotted lines in FIG. 9, condensate collection reservoir 252 may instead be fluidly coupled directly to water supply 220 (e.g., to a water supply tank) through condensate return conduit 270 and a condensate pump 280. According to such an embodiment, condensate 254 may be pumped into water supply 220 at any time using condensate pump 280, e.g., instead of relying on the operation of fresh water supply pump 272. Notably, according to such an embodiment, water supply 220 may include a water level sensor that is operably coupled to the water supply tank to ensure that over filling a water supply 220 does not occur.

Notably, certain operating conditions may occur where the collected condensate 254 exceeds the capacity of condensate collection reservoir 252. In this regard, for example, if gardening appliance 100 is operating in a high humidity environment such that condensate 254 is being generated at a very fast rate and little to no hydrating water is being supplied to a hydration system 180, condensate 254 may be collected faster than it is used. In order to relieve condensate collection reservoir 252 from condensate 254 in a productive manner (e.g., as opposed to simply discharging condensate 254 into wastewater reservoir 234), condensate collection tray 250 may define one or more overflow ports 282 that permit condensate 254 to drip from condensate collection reservoir 252 directly into root chamber 172. In this manner excess collected condensate 254 may be used to hydrate the roots of plants 124 instead of being discharged as wastewater. According to exemplary embodiments, overflow ports 282 are defined at a top of condensate collection tray 250, i.e., adjacent bottom wall 264 of evaporator housing 260

As explained herein, aspects of the present subject matter are generally directed to a plant growing apparatus that uses an evaporator positioned above the root chamber to cool the root chamber through natural convection. In addition, condensate can drip off the evaporator and may be collected in a condensate collection tray for use in hydrating the root chamber. In this regard, the condensate collection tray may be positioned under the evaporator and may have a tube connected to a venturi that connects between the supply tank and the supply pump or downstream of the supply pump. This venturi may operate to pull the collected condensate from the condensate collection tray and mix it with supply water. Notably, condensate may flow when the pump is activated and thus when a mixing tank positioned downstream of the pump needs water for hydrating the plants. The condensate collection tray may define one or more weep holes or apertures to allow collected condensate to drip out and into the root chamber when the condensate collection tray becomes full.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance defining a vertical direction, the gardening appliance comprising:
    a liner positioned within a cabinet and defining a grow chamber;
    a grow tower rotatably mounted within the liner, the grow tower defining a root chamber and a plurality of apertures for receiving one or more plant pods;
    a sealed system comprising an evaporator, a condenser, an expansion device, and a compressor; and
    a hydration system comprising:
        a supply conduit for providing a flow of liquid into the root chamber;
        a condensate collection tray positioned below the evaporator and defining a condensate collection reservoir for collecting condensate formed by the evaporator while the sealed system is operating; and
        a condensate return conduit fluidly coupling the condensate collection reservoir and the supply conduit for supplying the condensate into the supply conduit.

2. The gardening appliance of claim 1, further comprising:
    an evaporator housing defining an evaporator plenum for receiving the evaporator, wherein a bottom wall of the evaporator housing is positioned between the condensate collection reservoir and the evaporator plenum, and wherein the bottom wall defines at least one aperture to permit the condensate to flow from the evaporator plenum into the condensate collection reservoir.

3. The gardening appliance of claim 2, wherein the evaporator plenum is positioned above the root chamber along the vertical direction.

4. The gardening appliance of claim 1, wherein the condensate collection tray defines one or more overflow ports that permit the condensate to drip from the condensate collection reservoir into the root chamber.

5. The gardening appliance of claim 4, wherein the one or more overflow ports are defined at a top of the condensate collection tray adjacent a bottom wall of an evaporator housing.

6. The gardening appliance of claim 1, wherein the condensate return conduit extends above the condensate collection tray and curves downward to position an inlet proximate a bottom of the condensate collection reservoir.

7. The gardening appliance of claim 1, further comprising:
    a freshwater supply pump fluidly coupled to the supply conduit for urging fluid through the supply conduit.

8. The gardening appliance of claim 7, wherein the condensate return conduit is fluidly coupled to the supply conduit downstream of the freshwater supply pump.

9. The gardening appliance of claim 7, wherein the condensate return conduit is fluidly coupled to the supply conduit using a venturi.

10. The gardening appliance of claim 7, further comprising:
    a filter positioned downstream of the freshwater supply pump.

11. The gardening appliance of claim 1, wherein the condensate return conduit is fluidly coupled to a water supply tank, the hydration system further comprising:
    a condensate pump fluidly coupled to the condensate return conduit for selectively urging the condensate into the water supply tank.

12. The gardening appliance of claim 1, further comprising:
    a water supply containing water and being fluidly coupled to the supply conduit.

13. The gardening appliance of claim 12, wherein the water supply comprises a municipal water supply or a water supply tank.

14. The gardening appliance of claim 1, further comprising:
    a mixing tank fluidly coupled to the supply conduit to receive a flow of water and the condensate; and
    a nutrient supply fluidly coupled to the mixing tank to selectively provide nutrients into the mixing tank.

15. The gardening appliance of claim 1, further comprising:
    a discharge nozzle for selectively spraying the flow of liquid into the root chamber.

16. A hydration system for a gardening appliance, the gardening appliance comprising a liner positioned within a cabinet and a grow tower rotatably mounted within the liner, the grow tower defining a root chamber and a plurality of apertures for receiving one or more plant pods, and an evaporator, the hydration system comprising:
    a supply conduit for providing a flow of liquid into the root chamber;
    a condensate collection tray positioned below the evaporator and defining a condensate collection reservoir for collecting condensate formed by the evaporator; and
    a condensate return conduit fluidly coupling the condensate collection reservoir and the supply conduit for supplying the condensate into the supply conduit.

17. The hydration system of claim 16, further comprising:
    an evaporator housing defining an evaporator plenum for receiving the evaporator, wherein a bottom wall of the evaporator housing is positioned between the condensate collection reservoir and the evaporator plenum, and wherein the bottom wall defines at least one aperture to permit the condensate to flow from the evaporator plenum into the condensate collection reservoir.

18. The hydration system of claim 16, wherein the condensate collection tray defines one or more overflow ports defined at a top of the condensate collection tray that permit the condensate to drip from the condensate collection reservoir into the root chamber.

19. The hydration system of claim 16, further comprising:
    a freshwater supply pump fluidly coupled to the supply conduit for urging fluid through the supply conduit, wherein the condensate return conduit is fluidly coupled to the supply conduit downstream of the freshwater supply pump using a venturi.

20. The hydration system of claim 16, wherein the condensate return conduit is fluidly coupled to a water supply tank, the hydration system further comprising:

a condensate pump fluidly coupled to the condensate return conduit for selectively urging the condensate into the water supply tank.

\* \* \* \* \*